United States Patent [19]

Munk

[11] 3,795,450
[45] Mar. 5, 1974

[54] DUAL BEAM OPTICAL ABSORPTION PHOTOMETRY DETECTOR ASSEMBLY FOR HIGH PRESSURE APPLICATIONS

[75] Inventor: Miner N. Munk, Walnut Creek, Calif.

[73] Assignee: Varian Associates, Palo Alto, Calif.

[22] Filed: Jan. 18, 1973

[21] Appl. No.: 324,636

[52] U.S. Cl. .............................................. 356/246
[51] Int. Cl. ........................................... G01n 11/10
[58] Field of Search ..... 356/244, 246, 96, 201, 208, 356/181; 250/218

[56] References Cited
UNITED STATES PATENTS
3,391,597   7/1968   Gropper............................ 356/246

*Primary Examiner*—William L. Sikes
*Attorney, Agent, or Firm*—Stanley Z. Cole; Gerald M. Fisher

[57] ABSTRACT

A detector assembly providing a sample cell and a reference cell for use in a dual beam optical absorption photometry instrument wherein the reference cell and sample cell are formed by a pair of bores extending through a main detector body in an axial direction from one end of the body to the other end, each end of the body being provided with apparatus to seal the reference and sample bores from each other comprising a transparent lens with a flat surface positioned at the end of the body and over the cell openings, the outer face of the lens being convex, a thin sheet gasket material overlying the outer face of the lens, a metal pressure plate overlying the gasket material, both the gasket and pressure plate being provided with openings therein aligned with the sample and reference bores in the cell body, and means for exerting a pressure on the surface of the pressure plate whereby the pressure plate exerts a force on the gasket and lens to force the lens against the end wall of the cell body, the pressure plate deforming under pressure to assume the convex shape of the outer face of the lens whereby the pressure applied by the pressure plate is spread over the surface area of the lens with a maximum pressure applied at the central region thereof which is aligned with the wall section of the main body between the two cell bores. In one embodiment, an additional gasket material is positioned between the flat surface of the lens and the end of the cell body with suitable openings therein aligned with the sample and reference cell bores, this additional gasket material either being heat treated to fuse to the cell body and lens face and provide additional sealing or left in its natural state to provide resilience at the surface of the seal.

10 Claims, 3 Drawing Figures

DUAL BEAM OPTICAL ABSORPTION PHOTOMETRY DETECTOR ASSEMBLY FOR HIGH PRESSURE APPLICATIONS

BACKGROUND OF THE INVENTION

Dual beam optical absorption photometry which employs the measurement of the optical absorption properties of substances for qualitative and quantitative analysis is widely used in the field of liquid column chromatography wherein the effluent detector measures and records the concentration of the separated solutes as they emerge from the column in the eluting solvent. A dual cell detector is utilized having a first or sample cell for the sample comprising the solutes and eluting solvent as the sample emerges from the column and a second or reference cell which, in one analysis method, contains the solvent alone, such that optical absorption due to the solvent in the reference cell can be subtracted from the reading obtained from the solvent and solutes in the sample cell to give a resultant reading of the sample under analysis.

Since such detectors are designed to measure very small changes in solute concentration, the sample cell and also the reference cell are of small volume; to increase the sensitivity, the optical path through the substances is maintained long. This is accomplished by providing elongated, small diameter cell chambers. To eliminate reading differences introduced by differences in the light passing through the two cells, the cells are positioned very close together physically and a single ultraviolet source is employed to produce the two separate optical beams through the sample and reference cells.

The above considerations dictate a detector assembly comprising an elongated cylindrical detector body with the sample and reference cells formed by a pair of small diameter, parallel bores extending in the axial direction through the body from one end to the other and spaced close together. Ingress and egress openings are provided for each cell bore, these openings extending into the cylindrical body in a direction normal to the axis of the cell bores or passageways. Optically transparent plates such as lens and/or windows are pressed against the two ends of the cylindrical body to seal off the ends of the sample and reference cells. A single light source is then employed to direct a first beam of light axially through the long, narrow sample cell and onto an associated detector positioned at the other end thereof and to direct a second beam of light axially through the similar shaped reference cell and onto a second separate light detector at the other end.

This assembly performs satisfactorily with the two cells sealed from each other so long as the pressure differential between the sample cell and the reference cell is not great. However, at times it is desirable that the sample detector assembly be able to withstand the full column head pressure of present day liquid chromatograph systems, for example 5,000 PSI. This permits location of the reference cell downstream of the liquid pump and either upstream or downstream of the sample injector stage but upstream of the column. Such a location provides a high degree of compensation for changes in solvent composition. These changes may be either accidental or, in the case of gradient elution, introduced on purpose.

Where the reference cell is located upstream of the sample injection point, it is exposed only to the solvent and changes in the light transmitted through the reference cell reflect only changes in the solvent composition; these changes can be used to subtract out the solvent component in the output sample from the column. The degree of compensation is high, although affected by the time interval between passage of a given amount of solvent through the reference cell and through the detection cell.

In critical applications the reference cell can be located at the head of the column (or some intermediate point in the column) but below the point of sample injection. This location of the reference cell shortens the time interval between passage of the liquid through the two cells and therefore improves the degree of compensation for changes in solvent composition. For example, as the injected sample passes through the reference cell it gives a negative response on the detector. Since the sample components have not been separated at this point, there is a single response, and this response occurs prior to arrival of the separated components in the detection cell at the output end of the column. This reference peak is easily recognized due to its negative deflection and early arrival. Such a peak provides a precise time indicator for the measurement of the elution times of subsequent detection cell indicated peaks. It also provides an integrated measure of the total amount of UV absorbing constituents in the sample.

Detector assemblies able to withstand high pressure differentials between reference and sample cell are also needed in super critical chromatograph, where the solvent is held above its critical temperature and pressure throughout the separating column. The solvent pressure at the exit of the column is likely to be a few thousand P.S.I., and the use of troublesome flow restrictors before the solvent enters the detector can be eliminated by the use of detectors able to withstand high pressures.

The major weakness of the detector cell when employed under high pressure differentials occurs at the two ends of the cells where the cells are sealed from each other by the transparent lens or windows. Although these transparent plates are held against the ends of the detector body under pressure exerted by screw-down means so as to withstand pressures of the order of 2,000–3,000 PSI, the seal tends to break down as the pressure rises to the 4,000–6,000 PSI region, and leakage occurs between the sample and reference cells at one or both ends of the detector body.

SUMMARY OF THE PRESENT INVENTION

The present invention provides a novel dual cell detector assembly wherein the transparent lens seal off the sample and reference bores at the ends of the detector body in a manner so as to withstand high pressure differentials of the order of 5,000–6,000 PSI. In a preferred embodiment, each lens is held against the ends of the body by a suitable screw-down means acting through a thin, flexible metal pressure plate extending over the convex outer surface area of the lens. The pressure plate is deformed by the pressure action of the screw-down means during assembly so as to substantially conform to the convex shaped surface area of the lens. In this preferred embodiment, a thin rubber-like gasket material is sandwiched between the lens and the flexible metal pressure plate to cushion the lens from the pressure plate. Both the pressure plate and the gasket material are provided with openings therein aligned with the optical path through the sample and reference cell passageways of the detector body.

In applying pressure to the pressure plate to deform it against the convex outer surface of the lens, a maximum pressure is exerted at the central portion of the lens to in turn exert a maximum pressure between the transparent plate and the detector body at the wall region located at the center region of the body and between the sample and reference cells.

In a second embodiment of the detector cell assembly a gasket material is positioned between the end wall of the body and the lens to provide a resilience at the surface between the lens and the cell body. In one instance the gasket is left in its normal state. In another instance, while pressure is applied to the lens to force it against the gasket and body, heat is applied to produce a fusion of the rubber-like gasket material to the end wall of the body and to the lens. Thereafter, this gasket acts to seal the ends of the two cells when the final assembly is made with a screw-down means applying pressure to the outer face of the lens.

DESCRIPTION OF THE PREFERRED EMBODIMENTS

Figure 1:
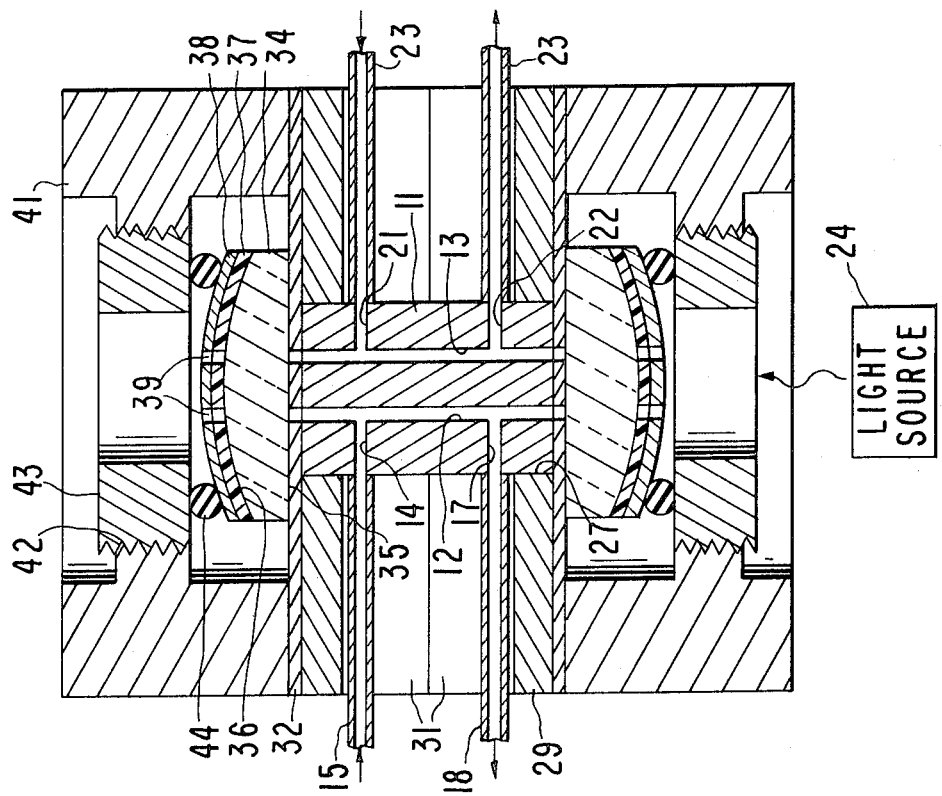
FIG. 1 is a cross-sectional view of a dual cell detector assembly incorporating the present invention.

Referring now to the drawings, the novel dual cell detector assembly of the present invention comprises a cell body 11 formed of a stainless steel cylindrical block, the cell body being provided with a pair of centrally disposed, spaced apart bores 12 and 13 forming the passageways or cells for the sample and reference materials, respectively. The sample cell 12 is provided with a sample ingress opening or passageway 14 and associated conduit or tubing 15 directed normal to the cell 12 and a similar egress passageway 17 and conduit 18. In like manner, the reference cell 13 is provided with ingress and egress passageways 21 and 22 and associated conduits 23. Thus a sample substance may pass into the passageway 12 through the ingress tubing 15 and passageway 14 and pass out from the cell through the egress passageway 17 and associated tubing 18. In like manner, the reference material flows through the reference cell 13. These sample and reference passageways 12 and 13 extend completely through the cylindrical cell body 11 in the axial direction so that a first beam of light from a common light source 24, e.g. UV light, may pass through the sample passageway 12 and the sample contained therein and impinge upon a first light detector apparatus 25 at the opposite end of the detector assembly. A second beam of light from the common light source 24 is directed through the reference substance in the reference cell 13 and onto a second light detector 26 positioned at the light egress end of the detector assembly.

The cell body or chamber 11 is positioned in an axial bore 27 formed in a pair of mating annular body members 28 and 29, each body member being provided with cutaway sections 31, permitting the conduits 15, 18 and 23 to pass in to the cell chamber 11. Each end of the cell chamber 11 is sealed by apparatus which is of similar construction and only the elements on one of the two ends will be described in detail. A transparent lens 34 is positioned over the end of the cell chamber 11 and the openings 12 and 13 therein, the inner surface 35 of the lens being flat and the outer surface 36 being convex. A rubber-like disc shaped gasket material 37 is positioned over the convex outer face 36 of the lens 34 and a stainless steel pressure disc 38 overlies the gasket. Both the gasket 37 and disc 38 are provided with a pair of openings 39 therein which are aligned with the sample and reference cells 12 and 13 in the cell chamber to permit the light beams to pass therethrough. During the initial assembly, the metal pressure disc 38 is flat and during assembly assumes the concave shape shown in FIG. 1.

An outer annular block member 31 is fixedly secured to the inner block members 28 and 29 via several mounting bolts 40 utilized to clamp the outer and inner blocks together to form a solid integral body assembly. The outer annular block member 41 is provided with a threaded bore 42 in the central region thereof. A threaded nut 43 is screwed into the threaded bore 42 of the outer body 41 with the inner end of the nut engaging an O-ring 44 which in turn engages the peripheral region of the metal pressure disc 38. By turning the nut 43 so that it moves in toward the cell chamber 11, a force is exerted on the outer peripheral region of the pressure disc 38 which causes the disc to be urged against the gasket 37 and convex surface 36 of the lens 34, the pressure disc 38 being deformed from its initial flat shape to the concave shape shown in FIG. 1 and thus assuming the configuration of the outer face of the lens 34.

This deformed pressure plate therefore exerts a significant pressure on the lens 34 and urges it in a sealing manner against the cylindrical cell chamber 11, thus sealing the two cell passageways 12 and 13 from each other. Since the pressure disc 38 was initially flat and contacted lens 34 via the gasket 37 only at the central region of the lens 34, the maximum pressure is exerted at the central region, i.e. the region between the sample cell 12 and reference cell 13 where the wall separates the two cells.

A typical pressure disc 38 is stainless, 0.5 inch diameter and 0.02 or 0.03 inch thick with the openings 39 having a diameter of about 0.08 inch and spaced apart about one eighth inch. The gasket or cushioning disc 37 is teflon (FEP) or rubber with a 0.05 inch diameter and 0.005 inch thick; the openings therein are slightly larger than the openings in the pressure disc, i.e. about 0.10 inch diameter.

A detector assembly constructed in this manner is able to withstand pressure differential between the reference and sample cell of 5,000 to 6,000 PSI.

Figure 2:
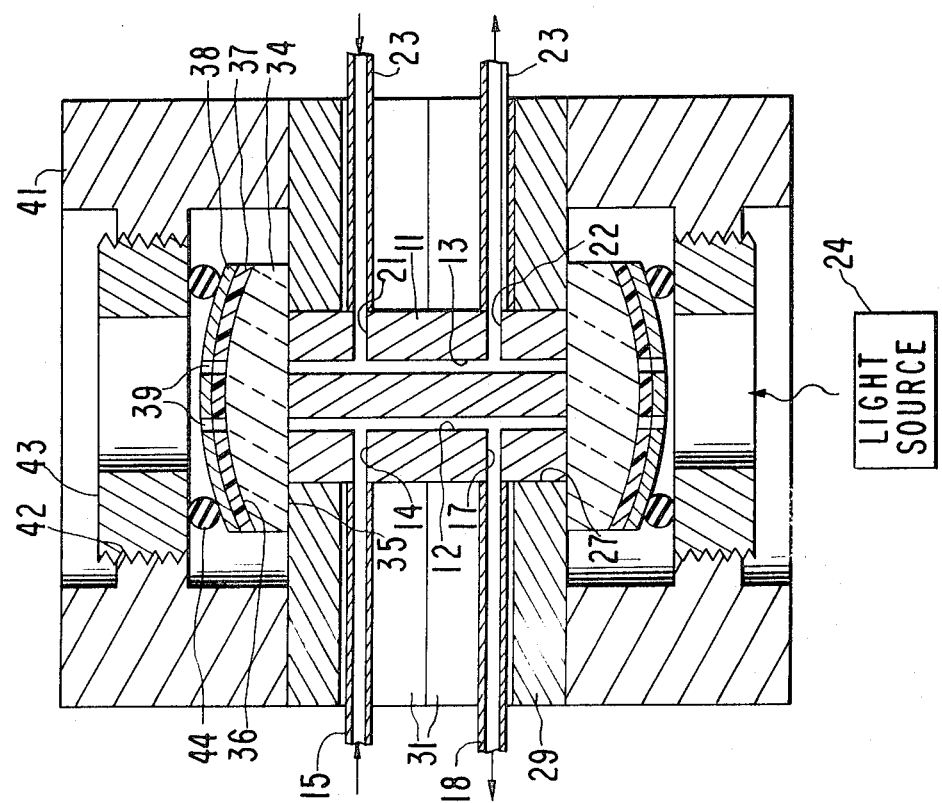
FIG. 2 is a cross-sectional view of a second form of the dual cell assembly.
Figure 3:
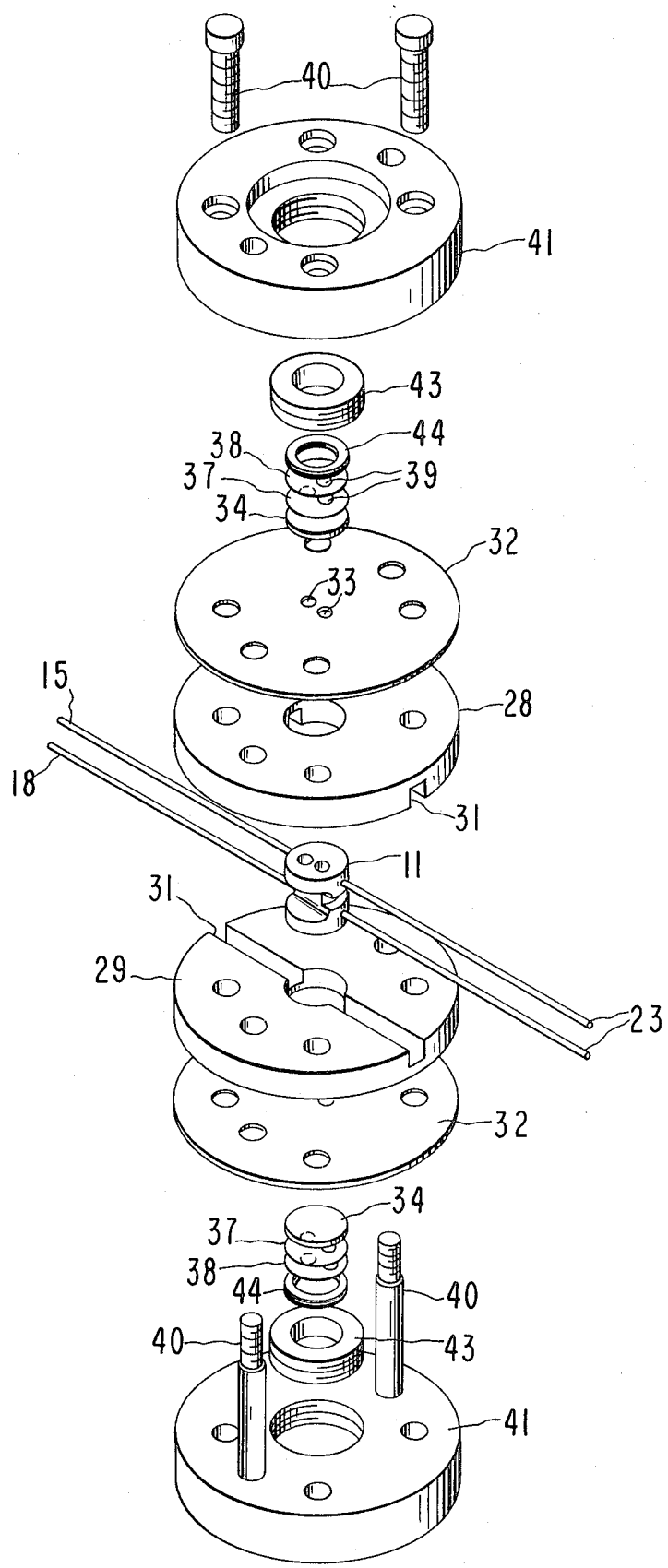
FIG. 3 is an exploded perspective view of the assembly of FIG. 2.

In a second embodiment of this invention (see FIG. 2), a thin rubber-like gasket material 32 such as FEP Teflon 0.005 inch thick having two openings 33 aligned with the reference and sample cell passageways in the cell chamber is positioned between the inner face 35 of the lens 34 and the end wall of the cell chamber 11. This gasket provides a resilience at the surface of the seal and reduces the requirement for the degree of mechanical matching between the sealing surfaces of the lens and cell body. To further enhance the sealing during fabrication of this detector cell assembly and prior to the insertion of the pressure screw means 43, a force is applied to the outer face 36 of the lens 34 which in turn applies force to the thin gasket material 32 positioned between the lens 34 and the cell body 11. Heat is then applied to the assembly to cause the gasket material to melt and fuse to both the cell body 11 and the lens 34 to thereby fixedly secure the lens to the cell body and form a seal between the lens and the body and seal off the area between the reference and cell passageways. Thereafter, the pressure disc 38 and gasket 37 may be placed over the outer surface 36 of the lens 34 and the screw means 43 tightened down to urge the pressure disc 38 and gasket 37 against the outer face of the lens, thus deforming the pressure disc 38 as described above and exerting a constant pressure against the lens. This pressure is well distributed over the total surface area of the lens although a maximum pressure is present at the central region of the lens as described above.

What is claimed is:

1. A detector assembly for a double beam optical absorption photometer comprising
    a cell chamber having a pair of passageways extending therethrough from one end thereof to the other end, said passageways being spaced apart and parallel with a wall portion formed between said two passageways by said cell chamber, said cell chamber having an inlet passage and an outlet passage for one of said passageways for passing a sample substance therethrough and an inlet passage and an outlet passage for the other of said passageways for passing a reference substance therethrough, whereby optical radiation may be passed in one beam through the sample substance passageway from said one end thereof to said other end thereof and passed in a second beam through the reference substance passageway from said one end thereof to said other end thereof,
    and sealing means at each end of said cell chamber, each sealing means comprising
    a lens positioned with a flat inner face against the end of the cell chamber and over the two ends of the two passageways and the wall section therebetween, the outer face of the lens being convex,
    and means for pressing said lens against the end of said cell chamber to form a pressure seal between the lens inner face and the end of the cell chamber to seal the passageways from each other comprising
    a disc shaped sheet of flexible gasket material with an inner face overlying the convex face of said lens,
    a metal pressure disc with an inner face overlying said flexible gasket, said gasket and said pressure disc each having a pair of openings therein aligned with the pair of passageways in said cell chamber to allow passage of the optical beams therethrough,
    and means for applying pressure to said pressure disc whereby said pressure disc and gasket conform to and press against the convex face of said lens to sealably urge said lens against said cell chamber.

2. A detector assembly as claimed in claim 1 wherein said pressure applying means comprises
    an annular member engaging the outer face of said pressure disc near the peripheral region thereof,
    and means for urging said annular member against the peripheral region of said pressure disc.

3. A detector assembly for a double beam optical absorption photometer comprising
    a cell chamber having a pair of passageways extending therethrough from one end thereof to the other end, said passageways being spaced apart and parallel with a wall portion formed between said two passageways by said cell chamber, said cell chamber having an inlet passage and an outlet passage for one of said passageways for passing a sample substance therethrough and an inlet passage and an outlet passage for the other of said passageways for passing a reference substance therethrough, whereby optical radiation may be passed in one beam through the sample substance in one passageway from said one end thereof to said other end thereof and passed in a second beam through the reference substance in the other passageway from said one end thereof to said other end thereof,
    and sealing means at each end of said cell chamber, each sealing means comprising
    a lens positioned with an inner surface facing the end of the cell chamber and over the two ends of the two passageways and the wall section therebetween,
    a rubber-like gasket material sandwiched between the end of said cell chamber and said inner lens surface, said gasket having a pair of openings therein aligned with the pair of passageways in said cell chamber to allow passage of the optical beams therethrough,
    and means for applying pressure to the outer face of said lens to urge it against the gasket and cell chamber end wall.

4. A detector assembly as claimed in claim 3 wherein the outer face of said lens is convex and wherein said pressure applying means comprises
    a disc shaped sheet of flexible gasket material with an inner face overlying the convex face of said lens,
    a metal pressure disc with an inner face overlying said sheet gasket, said sheet gasket and said pressure disc each having a pair of openings therein aligned with the pair of passageways in said cell chamber to allow passage of the optical beams therethrough,
    and means for applying pressure to said pressure disc whereby said pressure disc and sheet gasket conform to and press against the convex face of said lens to urge said lens against said fused gasket and said cell chamber.

5. A detector assembly as claimed in claim 4 wherein said pressure applying means comprises
    an annular member engaging the outer face of said pressure disc near the peripheral region thereof,
    and means for urging said annular member against the peripheral region of said pressure disc.

6. A detector assembly as claimed in claim 3 wherein said gasket material is fused to said cell chamber and said lens.

7. The method of sealing the flowing sample cell region from the flowing reference cell region in the detector assembly of a double beam optical absorption photometer wherein the cell chamber has a pair of cell passageways extending therethrough from one end thereof to the other end, said passageways being spaced apart and parallel with a wall portion formed by said cell chamber between said two passageways, said cell chamber having an inlet passage and an outlet passage for one of said cell passageways for passing a sample substance therethrough and an inlet passage and an outlet passage for the other of said cell passageways for passing a reference substance therethrough, whereby optical radiation may be passed in one beam through the sample substance cell passageway from said one end thereof to said other end thereof and passed in a second beam through the reference substance cell passageway from said one end thereof to said other end thereof, and wherein each cell end is sealed by a transparent lens positioned with a flat inner face against the end of the cell chamber and over the ends of the two cell passageways and the wall section therebetween to form a pressure seal between the lens inner face and the end of the cell chamber to isolate the cell passageways from each other, the outer face of the lens being convex, comprising the steps of positioning a disc shaped sheet of flexible gasket material with an inner face overlying the convex face of said lens, positioning a metal pressure disc with an inner face overlying said flexible gasket, said gasket and said pressure disc each having a pair of openings therein aligned with the pair of cell passageways in said cell chamber to allow the optical beams to pass therethrough, and exerting pressure against the outer face of said pressure disc to deform said pressure disc and said gasket to conform to and press against the convex face of said lens to sealably urge said lens against said cell chamber.

8. The method as claimed in claim 7 wherein the step of exerting pressure against the outer face of said pressure disc comprises exerting said pressure against the peripheral region of the pressure disc.

9. The method as claimed in claim 8 including the step of positioning a rubber-like gasket material between the end of said cell chamber and said inner lens surface, said gasket having a pair of openings therein aligned with the pair of passageways in said cell chamber to allow passage of the optical beams therethrough.

10. The method as claimed in claim 9 including the step of heating said latter gasket material to fuse it to the end of the cell chamber and the inner face of said lens.

* * * * *